United States Patent [19]

Halliday, Jr. et al.

[11] Patent Number: 4,815,884
[45] Date of Patent: Mar. 28, 1989

[54] REMOVABLE SEAL PROTECTOR AND SHAFT INSERTION GUIDE

[75] Inventors: William G. Halliday, Jr., Farmington; Douglas J. Dwenger, Romulus, both of Mich.

[73] Assignee: General Motors Corporation, Detroit, Mich.

[21] Appl. No.: 197,788

[22] Filed: May 23, 1988

[51] Int. Cl.4 .............................................. B25G 3/00
[52] U.S. Cl. ....................................... 403/13; 403/17; 277/11; 277/10; 285/4
[58] Field of Search ..................... 403/12, 13, 14, 17; 277/9.5, 10, 11; 206/612; 285/4

[56] References Cited

U.S. PATENT DOCUMENTS

| | | | |
|---|---|---|---|
| 2,446,493 | 8/1948 | Silvia et al. | 277/10 |
| 3,426,959 | 2/1969 | Lemelson | 206/612 X |
| 4,218,813 | 8/1980 | Cather, Jr. | 277/11 X |

*Primary Examiner*—Andrew V. Kundrat
*Attorney, Agent, or Firm*—Donald F. Scherer

[57] ABSTRACT

A seal protector (10) embodying the concepts of the present invention is employed to guide the insertion of a drive axle (not shown) through the central opening (33) of a seal (31) and to protect the seal (31) from any injury that might be occasioned to the seal (31) by virtue of any sharp edges and/or burrs that might be present on the drive axle being inserted through the seal (31). The seal protector (10) incorporates a sleeve (35) having a proximal end (36) and a distal end (38). Handle means (44) are operatively secured to the proximal end (36) of the sleeve (35). A parting groove (50) extends between the proximal and distal ends (36, 38) of the sleeve (35) to permit the annular integrity of the sleeve (35) to separate by the application of a radially directed force to the handle means (44). A radially oriented reinforcing flange (42) may extend circumferentially of the proximal end (36) of the sleeve (35), and if so, it would be provided with a radially oriented, second parting groove (55). The two parting grooves (50 and 55) should be aligned such that they could progressively tear upon the application of a radially directed force to permit the reinforcing flange (42) and sleeve (35) to separate and thereby permit the seal protector (10) to be removed from between the drive axle and the seal (31) after the drive axle has been insertingly received within the central opening (33) of the seal (31).

2 Claims, 2 Drawing Sheets

REMOVABLE SEAL PROTECTOR AND SHAFT INSERTION GUIDE

TECHNICAL FIELD

The present invention relates generally to a device for guiding a shaft as it is inserted through a seal. More particularly, the present invention relates to a shaft insertion guide that will protect the seal with which it is employed from damage that might otherwise be incurred as a result of being engaged by any sharp edges and/or splines which may exist on the end of a shaft to be inserted through the seal. More particularly, the present invention relates to a seal protector that can be readily and easily removed from between the shaft and the seal after the shaft has been insertably positioned through the seal.

BACKGROUND OF THE INVENTION

Drive axles operatively connect the transaxle mechanism of a vehicle to the hubs on which the wheels are mounted. The vast majority of drive axles incorporate a male spline which is secured to its mating member by barrel type snap rings. On the other hand, the inboard end on the left hand axle employed with at least automatic shifting transaxles generally utilizes a female spline which installs over a shaft that protrudes from the transaxle housing.

An axle seal is positioned interiorly of the access aperture in the housing of the transaxle, at the entry point of the drive axle assembly. The axle seal retains lubricant within the transaxle housing and prevents unwanted materials in the environment within which the transaxle is operating from entering the transaxle housing. To properly function, the seal must engage the uninterrupted periphery of the axle. Therefore, the seal must remain free of defects and aberrations, particularly at the seal-to-axle interface, if it to function effectively.

Insertion of the drive axle into the transaxle is the most frequent cause of damage to the axle seal. Generally, such damage results when a sharp edge, or burr, on the drive spline of the axle cuts, or even slightly nicks, the seal. Because integrity of the seal is required for its satisfactory operation, any damaged seal must be replaced. The necessity of replacing damaged seals can add to the time, and thus the cost, of the original assembly process. In addition, any maintenance procedure which requires removal of the drive axle, and then replacement thereof, after the vehicle has been assembled subjects the seal to a considerable likelihood of damage. This likelihood is greatly magnified because the mechanic must insert the axle in close quarters and around other vehicular parts which were not on the vehicle when the original drive axle was installed, all without a good view of the access aperture in the transaxle housing through which the drive axle must be inserted.

SUMMARY OF THE INVENTION

It is, therefore, a primary object of the present invention to provide a device by which to protect the axle seal supported within the access aperture of the transaxle housing during insertion of an axle through the seal.

It is a another object of the present invention to provide an axle seal protector, as above, which can be insertably received interiorly of the axle seal to permit a drive axle, in turn, to be insertably received through the seal protector during original manufacture, or during subsequent maintenance procedures, without damage to the seal.

It is a further object of the present invention to provide an axle seal protector, as above, which can be easily removed after the axle has been inserted into, and is operatively seated with respect to, the transaxle.

It is still another object of the present invention to provide an axle seal protector, as above, which may be employed in conjunction with a means selectively to plug the access aperture in the transaxle housing at any time that the axle seal protector is operatively received through the axle seal positioned within the access aperture.

It is yet another object of the present invention to provide an axle seal protector, as above, which is easily removed after the axle has been operatively inserted through the axle seal.

These and other objects of the invention, as well as the advantages thereof over existing and prior art forms, which will be apparent in view of the following detailed specification, are accomplished by means hereinafter described and claimed.

In general, an axle seal protector embodying the concepts of the present invention employs an annular sleeve having a distal as well as a proximal end. A handle means is secured to the proximal end of the sleeve, and may, in fact, extend radially outwardly from a reinforcing flange which may circumscribe the proximal end of the sleeve.

A parting groove extends between the proximal and the distal ends of the sleeve to permit the annular integrity of the sleeve to separate therealong by the application of a radially directed force to the sleeve, as may be conveniently applied through the handle means. Should a reinforcing flange be employed, a second parting groove should be provided to extend radially of the reinforcing flange, and the parting groove provided in the reinforcing flange should align with the parting groove provided in the sleeve.

One exemplary axle seal protector, deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
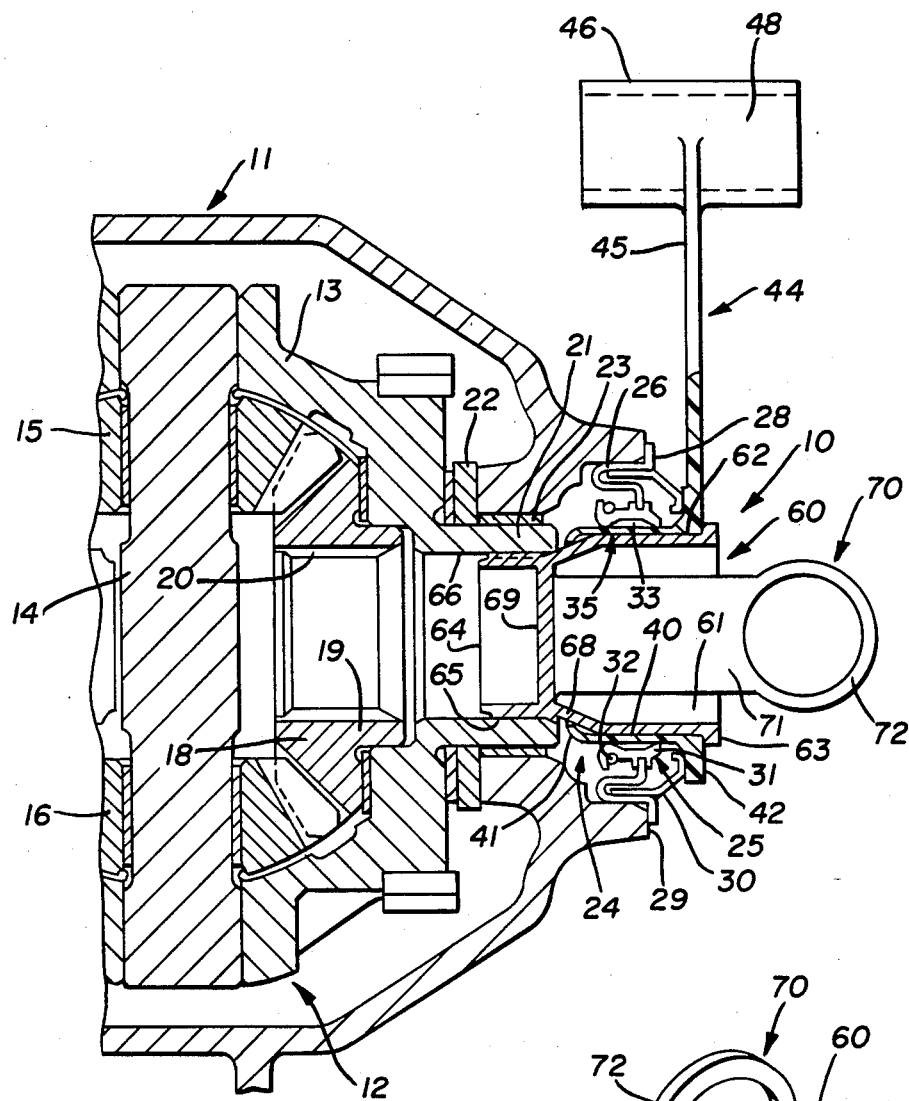
FIG. 1 is a cross sectional view through a portion of a typical transaxle depicting an axle seal operatively positioned within an access aperture of the transaxle housing through which a drive axle is inserted to seat with the side gear of the differential encased within the transaxle housing, a seal protector as well as a plug means, both embodying the concepts of the present invention, being operatively positioned through the axle seal.

One representative form of an axle seal protector embodying the concepts of the present invention is designated generally by the numeral 10 on the accompanying drawings. The representative seal protector 10 is depicted, in FIG. 1, as being operatively employed in conjunction with a transaxle housing, or case, 11.

A differential assembly 12 is encased within the transaxle housing 11, and the portion of the differential assembly 12 depicted includes the differential carrier 13 from which a pinion shaft 14 is mounted. Two differential pinions 15 and 16 are rotatably mounted on the pinion shaft 14 and mesh with a side gear 18. The side gear 18 has a hub portion 19, the interior of which is splined, as at 20, drivingly to engage the male, splined end of a drive axle (not shown), as is well known to the art.

The hollow neck 21 f the differential carrier 13 aligns with the hub portion 19 of the side gear 18, and the neck 21 rotatably coacts with the transaxle housing 11 through a thrust bearing 22 and a bushing 23. The hub 20 and the hollow neck 21 mutually align with an access aperture 24 in the transaxle housing 11. The drive axle must extend through the access aperture 24 to seat with the splines 20 within the hub 19 of the side gear 18.

As depicted in FIG. 1, the axle seal assembly 25 is disposed within the access aperture 24. Specifically, the seal assembly 25 employs a positioning clip 26 that is supported within the access aperture 24. A tab 28 extends radially from the clip 26 and engages the planar end surface 29 of the transaxle housing 11 which circumscribes the access aperture 24 to determine the inner extent to which the positioning clip 26 can be inserted within the access aperture 24. A stone shield 30 engages and positions the protector 10.

The annular seal 31 is supported from the positioning clip 26, and a spring, or other biasing means, 32 constricts the seal 31 against whatever is received within the annular, central opening 33 which extends through the seal 31, even the seal protector 10 which will now be described in detail.

Figure 2:
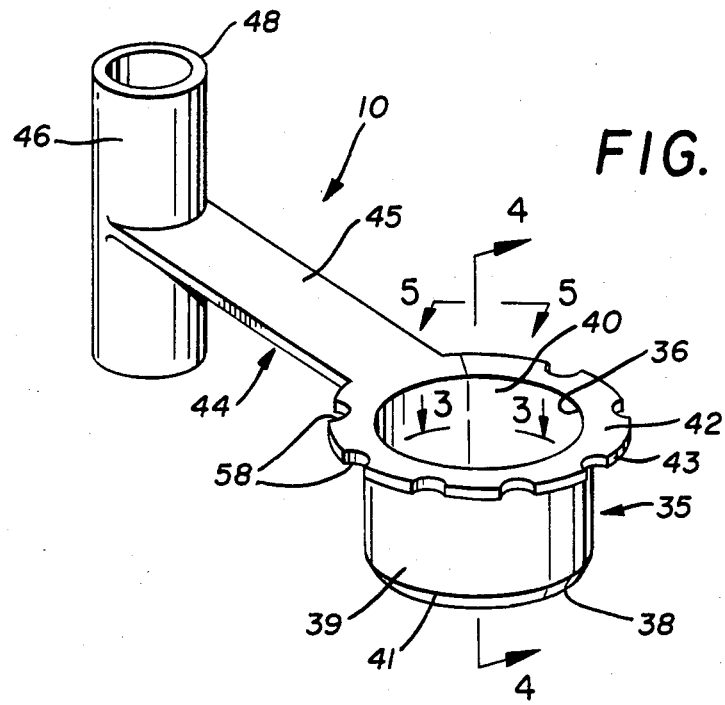
FIG. 2 is a perspective view of the seal protector operatively depicted in FIG. 1.

With particular reference to FIG. 2, the protector 10 incorporates a sleeve 35 having proximal and distal ends 36 and 38, respectively. The sleeve 35 may well be annular, and as such presents a smooth exterior surface 39 that may be generally cylindrical over a substantial length of the sleeve 35. The interior surface 40 may also be smooth and may likewise be generally cylindrical over a substantial length of the sleeve 35. The generally cylindrical configuration of at least the exterior surface 39 preferably terminates in proximity to the distal end 38, at which point the sleeve 35 curves radially inwardly to present a pilot 41 which facilitates selective insertion of the sleeve 35 into the central opening 33 through the annular seal 31, as will hereinafter be more fully explained.

A radially extending reinforcing flange 42 circumscribes the proximal end 36 of the sleeve 35 and terminates in a peripheral outer edge 43. A handle means, indicated generally by the numeral 44, is secured to, and extends radially outwardly from, the peripheral outer edge 43 of the reinforcing flange 42. Although the handle means 44 may be provided in any number of suitable configurations, a suitable embodiment employs a radially extending arm 45 that may be integrally formed with the reinforcing flange 42. The radial extent of the arm 45 should be sufficient to permit easy access to the gripping portion 46 presented from the radially outer end of the arm 45. The gripping portion 46 may similar be provided in a number of acceptable configurations. For example, the transverse bar grip 48 depicted will allow one to obtain a desirable purchase for applying a considerable amount of hand pressure thereagainst. Even a ring-like grip (not shown) will allow sufficient purchase to apply the force necessary to remove the protector, as will also be hereinafter more fully explained.

Figure 4:
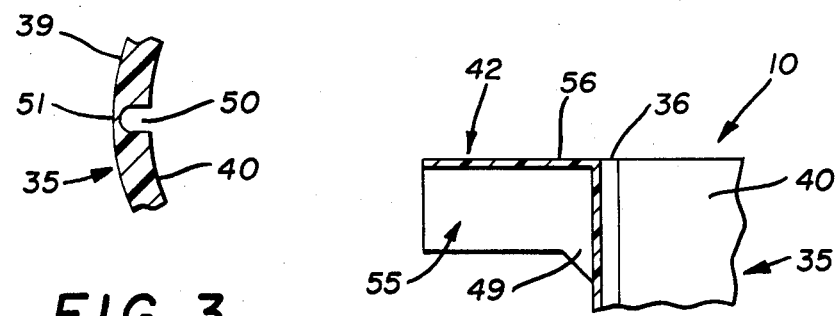
FIG. 4 is a view taken substantially along line 4—4 of FIG. 2 depicting, in section, the thin membranes along which the parting grooves in the sleeve and the reinforcing flange progressively tear.
Figure 5:
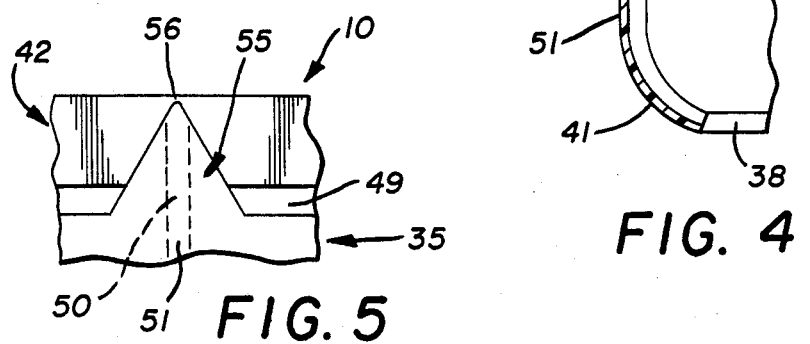
FIG. 5 is a partial side elevational view taken substantially along line 5—5 of FIG. 4 and depicting the alignment of the parting groove in the sleeve portion with the parting groove in the reinforcing flange which extends radially of the sleeve portion; and, FIG. 6 is a perspective view appearing on the same sheet of drawings as FIG. 1 and depicting a typical plug means that may be employed on conjunction with the axle seal protector in the manner depicted in FIG. 1.

To assure that the reinforcing flange 42 will not inadvertently separate from the sleeve 35 it may be desirable to enhance the strength of the juncture between those two portions by the haunch 49 depicted in FIGS. 4 and 5, or other transitional fillet.

Figure 3:
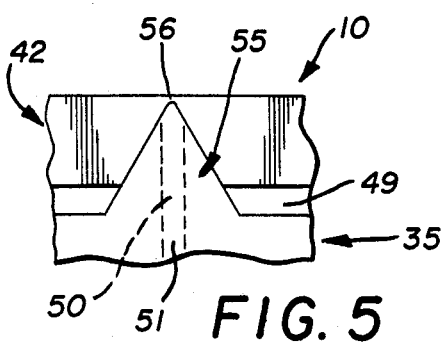
FIG. 3 is a view taken substantially along line 3—3 of FIG. 2 and depicting, in transverse section, the parting groove, and thin membrane, which extends between the proximal and the distal ends of the sleeve portion in the seal protector.

As best represented in FIGS. 3–5, a first parting groove 50 extends along the interior surface 40 of the sleeve 35 between the proximal and distal ends 36 and 38, respectively, thereof. The parting groove 50 is of sufficient depth that it allows only a relatively thin membrane 51 (FIGS. 3 and 4) at the base thereof to complete the annular, structural integrity of the sleeve 35.

A second parting groove 55 extends radially of the reinforcing flange 42, and the second parting groove 55 preferably aligns with the first parting groove 50. The second parting groove 55 is also of sufficient depth that it allows only a relatively thin membrane 56 (FIGS. 4 and 5) at the base thereof to complete the annular, structural integrity of the reinforcing flange 42.

Upon the application of a radially directed force to the reinforcing flange 42, and the proximal end 36 of the sleeve 35, the relatively thin membranes 51 and 56 at the base of the parting grooves 50 and 55, respectively, progressively tear to permit the annular integrity of the sleeve 35 and the reinforcing flange 42 to separate along the parting grooves 50 and 55. The requisite radial force can be conveniently applied to the sleeve 35, and reinforcing flange 42, through the handle means 44 which is structurally connected to the proximal end 36 of the sleeve 35 through the reinforcing flange 42. It has been found that the first and second parting grooves 50 and 55 may be placed at virtually any location around the circumference of the sleeve 35—except, of course, at the location where the handle means 44 attaches to the sleeve 35—to permit removal of the protector 10 from between a drive axle and the sleeve 35 through which the drive axle extends. However, it is preferable that the parting grooves 50 and 55 be located immediately adjacent to either side of the arm 45 where it is secured to the peripheral outer edge 43 of the reinforcing flange 42.

To facilitate removal of the sleeve 35 it is desirable that a plurality of circumferentially spaced indentations 58, as best seen from FIG. 2, be provided in the peripheral outer edge 43 of the reinforcing flange 42. The indentations 58 allow the reinforcing flange 42 to straighten in response to the radial force applied thereto by the handle means 44. Thus, when the membranes 51 and 56 progressively tear the application of a continued radial force to the handle means 44 will cause the reinforcing flange 42 to straighten and withdraw the sleeve 35 from between the drive axle and the seal 31.

Figure 6:
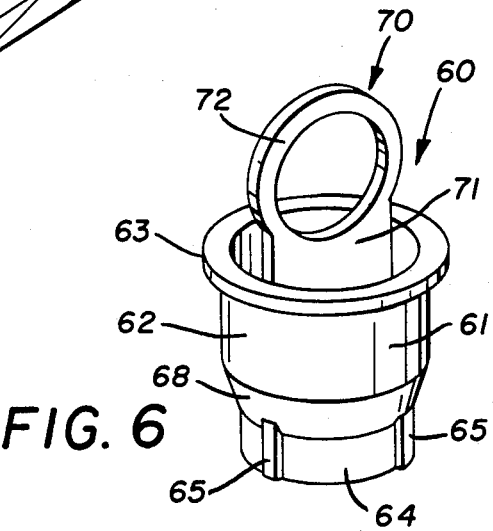

In those situations where the drive axle will not be immediately connected to the transaxle 11, it may be desirable to preclude access to the interior of the transaxle housing by inserting a plug 60 in the protector 10. As best depicted in FIGS. 1 and 6, one form of the plug 60 has a sealing portion 61 that is received within the sleeve 35 such that the cylindrical exterior surface 62 of the sealing portion 61 engages the interior surface 40 of the sleeve 35. A stop flange 63 extends radially from one end of the sealing portion 61 to engage the reinforcing flange 42 and thereby define the limit to which the sealing portion 61 can be inserted within the sleeve 35.

The plug 60 has a locating and stabilizing head portion 64 which is received within the neck 21 of the differential carrier 13. A plurality of longitudinally extending, radially raised ridges 65 are spaced circumferentially about the outer periphery of the head portion 64. The ridges 65 firmly engage the cylindrical interior surface 66 of the neck 21 to retain the plug 60 in position and to assure that the desired radial location of the plug 60 will be maintained when the plug 60 is seated within the seal protector 10. The ridges 65 extend axially along the head portion 64 for a distance sufficient to stabilize the plug 60 against any movement other than axial insertion and removal of the head portion 64 relative to the neck 21.

A conically tapered transitional portion 68 not only connects the head portion 64 to the sealing portion 61 but also assures that the plug 60 will clear the radially inwardly curved pilot 41 on the distal end 38 of the sleeve 35.

A closure wall 69 (FIG. 1) extends transversely of the plug 60 and preferably intersects the juncture of the head portion 64 with the transitional portion 68. The closure wall 69 also makes a convenient base from which to secure a handle means 70. Although virtually any handle means would suffice, the exemplary arrangement depicted employs an arm 71 that extends axially outwardly from the closure wall 69 and terminates in a gripping portion 72. As shown, the gripping portion 72 may constitute an annular ring or it may, with equal facility, constitute a transversely oriented bar member, not shown.

In any event, after an axle seal assembly 25 has been installed in the access aperture 24 of the transaxle housing 11, and has been inspected for the required integrity, the axle seal protector 10 is inserted through the central opening 33 of the seal 31 until the reinforcing flange 42 engages the stone shield 30. Once inserted, the protector 10 should be rotated in its seated position until the handle means 44 is disposed in an orientation which will most conveniently permit subsequent removal of the protector 10. If desired, a plug 60 can then be inserted into the sleeve 35 of the protector 10.

Whenever desired, a drive axle may be operatively connected to the transaxle by first removing the plug 60, if present, and then inserting the end of the drive axle through the sleeve of the protector 10 until the snap ring on the end of the drive axle is fully seated, as is well known to the art. Thereafter, the protector 10 is removed by applying a radially directed force to the handle means 44. In response to that radial force the thin membrane 56 at the base of the parting groove 55 in the reinforcing flange 42 will split along the parting groove 55, and that tear will propagate along the thin membrane 51 at the base of the parting groove 50 which extends longitudinally of the sleeve 35 to allow continued application of a radially directed force to the handle means 44 to withdraw the sleeve 35 from between the drive axle-to-seal 31 interface. Upon removal of the protector 10 it should be discarded inasmuch as the protectors 10 are designed for only a single use.

As should now be apparent, the present invention not only provides a device which protects an axle seal during insertion of a drive axle therethrough but also otherwise accomplishes the objects of the invention.

The embodiments of the invention in which an exclusive property or privilege is claimed are defined as follows:

1. A removable seal protector and shaft insertion guide comprising: an annular sleeve having a distal end and a proximal end; a reinforcing flange extending radially from the proximal end of said sleeve; a handle means secured to and extending radially from said reinforcing flange; the distal end of said sleeve being curved radially inwardly to present a pilot for facilitating selective insertion of said sleeve within an access aperture; a first parting groove extending between said proximal and said distal ends of said sleeve; a second parting groove extending radially along said reinforcing flange to align with said first parting groove; said first and second parting grooves permitting the annular integrity of said sleeve and reinforcing flange, respectively, to separate by application of a radially directed force to said reinforcing flange through said handle means.

2. A removable seal protector and shaft insertion guide comprising: an annular sleeve having a distal end and a proximal end with smooth interior and exterior, generally cylindrical surfaces extending therebetween; a reinforcing flange extending circumferentially of said sleeve and being oriented to extend radially from the proximal end of said sleeve to terminate in a peripheral outer edge; a handle means secured to and extending radially from the peripheral outer edge of said reinforcing flange; the distal end of said sleeve being curved radially inwardly to present a pilot for facilitating selective insertion of said sleeve within an annular seal; a first parting groove extending along said generally cylindrical, interior surface of said sleeve between said proximal and said distal ends of said sleeve; a second parting groove extending radially along said reinforcing flange to align with said first parting groove; a plurality of indentations spaced circumferentially along the peripheral outer edge of said reinforcing flange; plug means removably positionable interiorly of said sleeve; said first and second parting grooves permitting the annular integrity of said sleeve, and said reinforcing flange, to separate by application of a radially directed force to said reinforcing flange through said handle means.

* * * * *